United States Patent

Daddis, Jr. et al.

[11] Patent Number: 6,029,942
[45] Date of Patent: Feb. 29, 2000

[54] SIMPLIFIED COMPRESSOR MOUNT WITH SELF FORMING GROMMET

[75] Inventors: Eugene D. Daddis, Jr., Nedrow; Ronald D. Haven, Cicero; Steven Glowacki, Brewerton, all of N.Y.; Bradley L. Kersh, Flint, Tex.

[73] Assignee: Carrier Corporation, Farmington, Conn.

[21] Appl. No.: 09/046,721

[22] Filed: Mar. 24, 1998

[51] Int. Cl.[7] .................................................. F16M 1/00
[52] U.S. Cl. .......................... 248/635; 248/673; 248/678; 248/638; 411/38
[58] Field of Search ..................... 248/562, 638, 248/634, 678, 680, 500, 346.03, 501, 635; 411/34, 38, 55

[56] References Cited

U.S. PATENT DOCUMENTS

| | | | |
|---|---|---|---|
| 2,365,372 | 12/1944 | Allen | 411/34 X |
| 3,096,781 | 7/1963 | Roidt | 248/678 X |
| 3,910,155 | 10/1975 | Wilson | 411/34 |
| 4,289,060 | 9/1981 | Emmett | 411/34 |
| 4,776,737 | 10/1988 | Wollar | 411/38 |
| 5,135,340 | 8/1992 | Stinson | 411/38 X |
| 5,277,554 | 1/1994 | Elson | 248/638 X |
| 5,303,896 | 4/1994 | Sterka | 248/634 X |
| 5,683,215 | 11/1997 | Gaignard et al. | 411/34 |
| 5,881,989 | 3/1999 | O'Brien et al. | 248/634 |

Primary Examiner—Derek J. Berger
Attorney, Agent, or Firm—Wall Marjama Bilinski & Burr

[57] ABSTRACT

Mourning apparatus for retaining and isolating a machine subject to vibratory forces. A base plate having a series of raised bosses on its top surface is equipped with rubber grommets that are received upon each boss. Each grommet has an expanded foot and an elongated body that is insertable into the mounting hole of a machine support bracket. A weakened section is provided in the top part of each body that expands radially when the body is compressed to provide an upper flange for capturing the support bracket between the foot piece and the upper flange. Each grommet is compressed by passing a bolt axially through the grommet and through the bolt into the boss.

10 Claims, 5 Drawing Sheets

6,029,942

SIMPLIFIED COMPRESSOR MOUNT WITH SELF FORMING GROMMET

BACKGROUND OF THE INVENTION

This invention relates to a self forming isolator for a machine such as a motor or a compressor to isolate the machine during shipping and when the machine is placed in operation.

More specifically, the invention relates to an isolator for the compressor of an air conditioning unit that can be used to protect the compressor during shipping and to isolate the compressor from other components of an air condition unit when placed in operation. Many machines, particularly those that are subject to vibrations, are mounted upon rubber pads, which to some extent dampen the vibrations. However, the pads only act upon the bottom of the machine mounting bracket and do little to protect the device as it moves in an upward direction. The pads furthermore can not be effectively used for shipping purposes because again, they provide little protection in the event the machine is tipped on its side or inverted during shipping.

Grommets have been utilized in the air conditioning industry which extend the amount of protection and isolation afforded a compressor during shipping and when placed in operation in a refrigeration system. These prior art grommets take the form of a cylindrical body section having a large head at its base and a smaller head at its distal end. In practice, the smaller head is forced through one of the mounting holes in the base or supporting brackets of the compressor so that it is entrapped on the body section between the two opposed heads. Once in place, the grommet affords protection to all the contacting surfaces of the compressor support bracket and thus can be used for both shipping and installation purposes. Typically, a headed bolt is passed through the grommet and fastened to a substrate such as a base plate or the like.

Although the double headed grommet represents an improvement over a conventional mounting pad, it nevertheless poses certain problems. First, the grommet is difficult to install in a mounting hole of a support bracket because the head of the grommet must be forced through the mounting hole. The size of the head is thus restricted and can easily be damaged during installation rendering the grommet unsuitable for use. Once the grommet is in place within the mounting hole, a sleeve is inserted into a central hole provided in the grommet. A bolt is then passed through the sleeve and affixed to the base plate. As can be seen, the number of operations involved in securing just one leg of a support bracket to a substrate are rather numerous and the entire operation is rather time consuming. Lastly, finding the exact location for the grommets upon a substrate or base plate is sometimes a difficult and also time consuming operation.

SUMMARY OF THE INVENTION

It is therefore a primary object of the present invention to improve devices for retaining and isolating machines during shipping and when placed in operation.

It is a further object of the present invention to provide an improved vibration damper for an oscillating machine.

It is a still further object of the present invention to simplify the installation of isolation dampers on the support bracket of a machine such as a refrigerant compressor.

Another object of the present invention is to provide a grommet type damper that can be quickly installed on the support bracket of an air conditioner compressor using a minimum amount of parts and operational steps.

These and other objects of the present invention are attained by a mounting apparatus for a machine such as a refrigerant compressor having a support bracket containing a series of mounting holes. The apparatus includes a base plate having a plurality of raised bosses on its top surface that aligned with the mounting holes in the machine support bracket. A rubber-like grommet is mounted upon each of the bosses. Each grommet includes a radially expandable foot piece upon which an elongated body is integrally mounted in axial alignment. An opening passes axially through the grommet and is arranged to slidably receive a boss that is passed upwardly through the foot piece into the body. The upper part of the body which is located over the top of the boss is weakened so that it will expand outwardly in a radial direction to create an upper flange when the body is placed under a compressive axial load. A bolt is passed downwardly through the grommet opening and is threaded down into the boss to compress the body sufficiently to expand the upper part thereof.

In assembly, the body of a grommet is passed upwardly into each mounting hole of the machine support bracket and the grommets are in turn placed upon the prealigned bosses. The bolts are then tightened down in the bosses to expand the top part of each grommet thus capturing the machine support bracket between the foot piece of the grommet and the upper flange created by the expanded top part of the grommet body.

Alternatively, the grommet may be seated over tapped holes formed in the base plate and the bolts threaded in the tapped holes to compress the body section of each grommet.

BRIEF DESCRIPTION OF THE DRAWINGS

For a better understanding of these and other objects of the present invention, reference will be made to the following detailed description of the invention which is to be read in conjunction with the accompanying drawing, wherein.

DESCRIPTION OF THE INVENTION

Referring initially to FIGS. 1–6, there is shown a first embodiment of the present invention that is ideally suitable for use in retaining and isolating a refrigerant compressor that is typically employed in an air conditioning system. Although the invention will be described with specific reference to a compressor for an air conditioner unit, it should be clear to one skilled in the art that the present invention has further application and can be used in association with any number of machines that might require a soft support platform during shipping and protection against either internally or externally induced vibrations when placed in some type of system.

Figure 1:
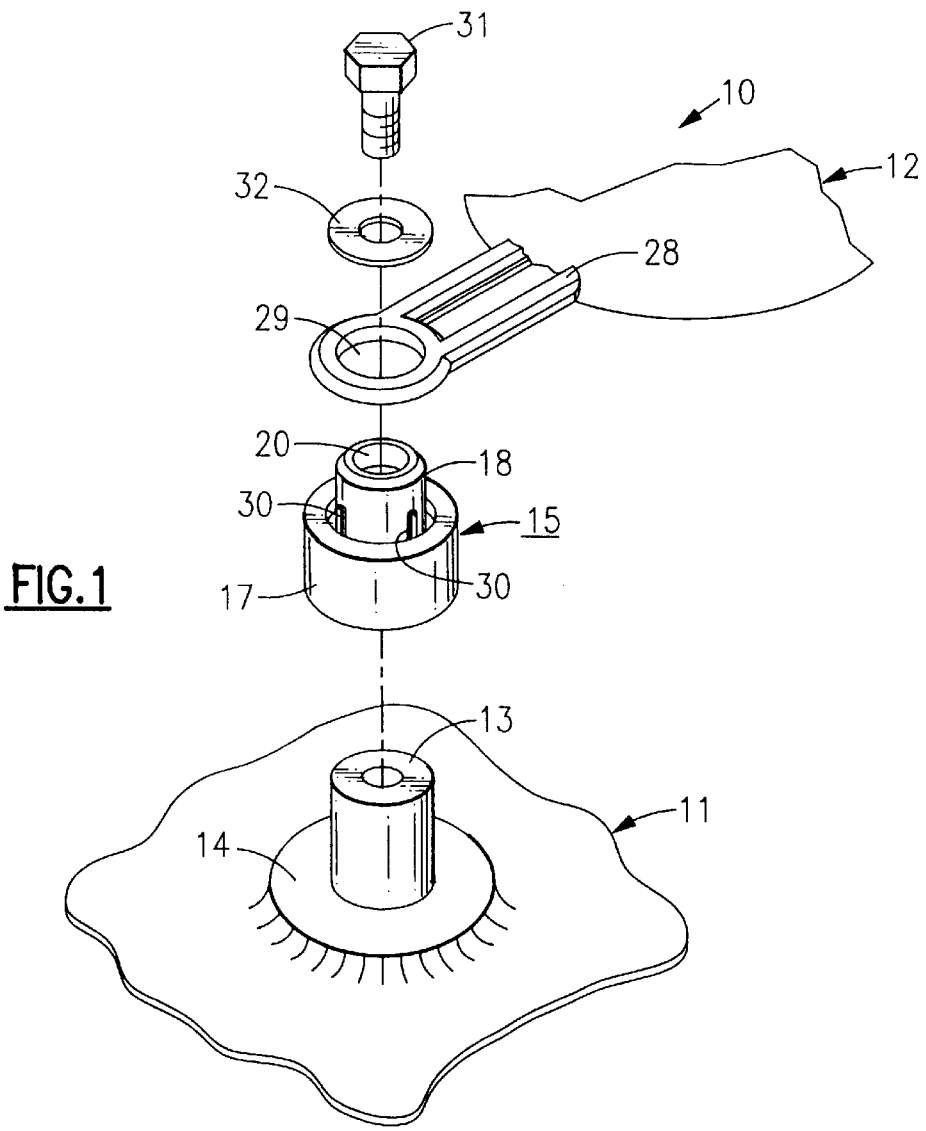
FIG. 1 an exploded view in perspective showing a first embodiment of the present invention.
Figure 2:
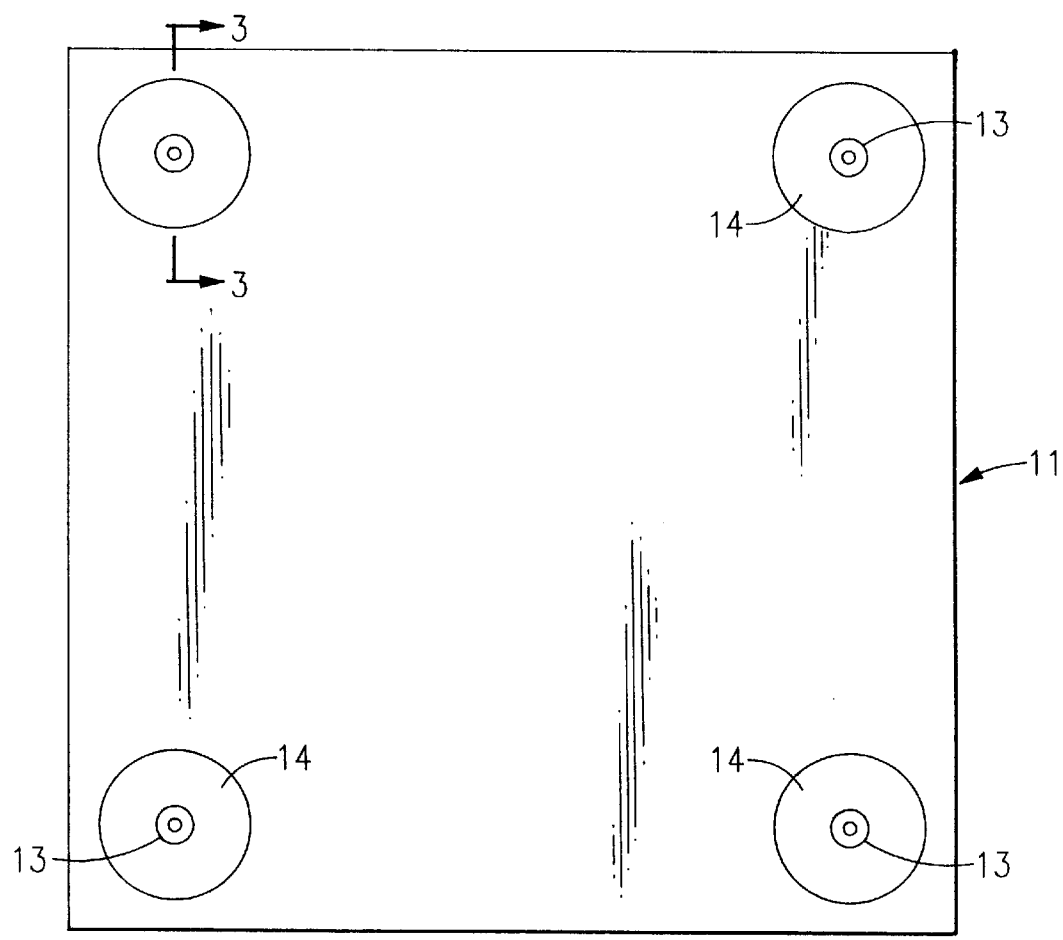
FIG. 2 is a top elevation of a base plate utilized in the practice of the present invention.
Figure 3:
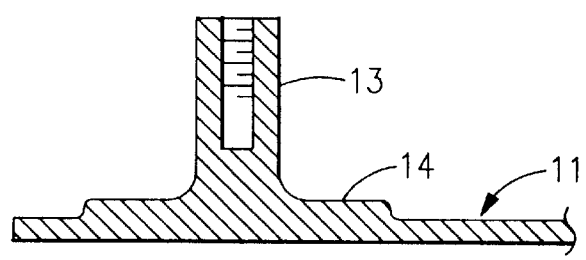
FIG. 3 is an enlarged partial side view in section showing one of the bosses contained on the top surface of the base plate shown in FIG. 2.

As illustrated in FIGS. 1–3 the apparatus of the present invention includes a base plate 11 containing a plurality of bosses 13 that are raised from the top surface of the base to a given height. A mounting pad 14 is placed under each of the raised bosses and, as will be explained in greater detail below, is adapted to provide a seat for a rubber grommet generally referenced 15 (FIG. 1). Preferably, the base plate, the bosses, and the mounting pads are all integrally formed from plastic or a high strength composite to provide a unitized structure capable of supporting a machine during either shipping when the machine can be exposed to damage due to rough handling, or when placed in operation wherein the machine can be exposed to vibrator forces which can be either internally or externally induced.

Figure 4:
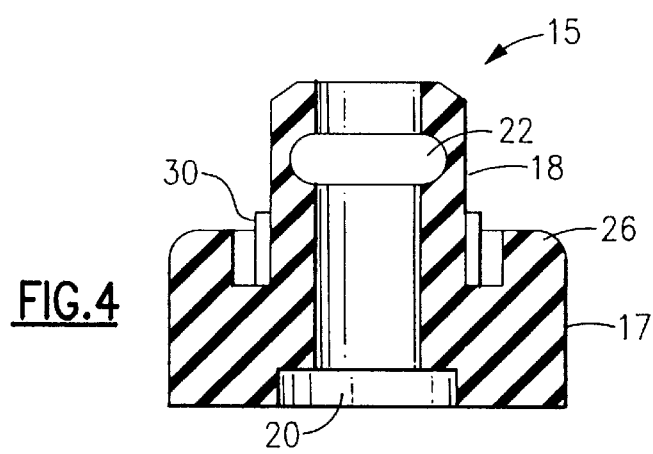
FIG. 4 is an enlarged sectional view of a grommet used in practice of the present invention.

A grommet 15 (FIG. 1) is placed over each of the raised bosses on the base plate in assembly. As illustrated in FIG. 4, each grommet includes an annular shaped foot piece 17 that is axially aligned with an elongated cylindrical body 18 that is mounted upon the top surface of the foot piece. An opening 20 passes axially through both the foot piece and the body of the grommet. The upper part of the body contains a radially disposed circular groove 22 formed in the wall of the opening. The groove allows the top of the body to expand or "mushroom" outwardly when the body is placed under compression to create an upper flange; the function of which will be explained in greater detail below.

Although a continuous circular V-shaped groove is illustrated in FIG. 4, the groove may take any suitable form that will enable the top part of the body to be expanded outwardly in a radial direction when the body is compressed. For example, the groove may be cup-shaped or it may be interrupted rather than a continuous circle to provide a series of arcuate shaped cutout segments circumferentially spaced about the inner wall of the opening.

The annular foot of the grommet is further provided with a raised lip 26 that encircles the periphery of the upper surface of the foot.

Figure 5:
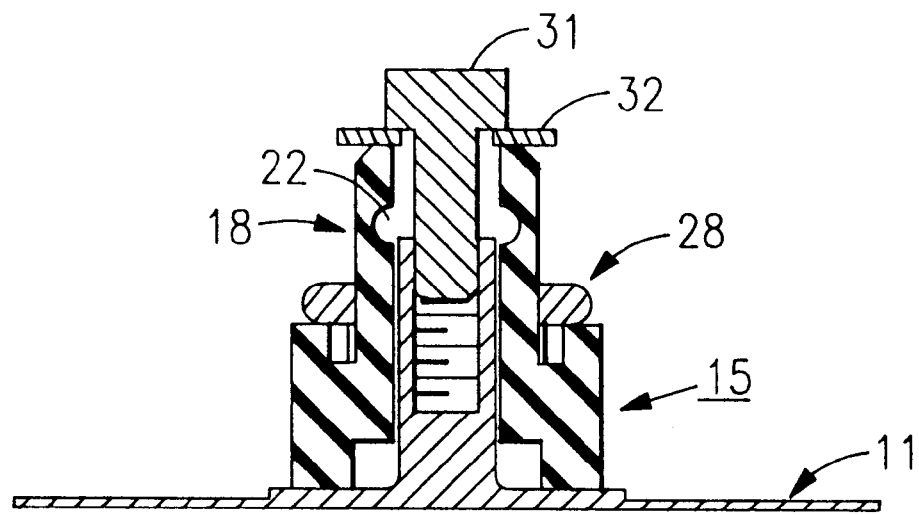
FIG. 5 is a side view in section showing a grommet mounted upon the base plate in an uncompressed state.

In assembly, a grommet 15 is passed over each of the raised bosses 13 on the base plate 11 and the foot piece 17 is seated on the underlying pad 14 of the base plate. As shown in FIG. 5, the height of the boss above the pad is such that the top of the boss is located somewhat below the groove 27 located in the opening 20. The mounting arm or support bracket 28 of the compressor is provided with a mounting hole 29, and the body of the grommet is passed through the mounting hole thus allowing the bracket to rest on the raised lip of the foot piece. Axially aligned ribs 30 are provided upon the lower section of the body which frictionally engage the mounting hole of the machine support bracket to retain and align the bracket in assembly.

Figure 6:
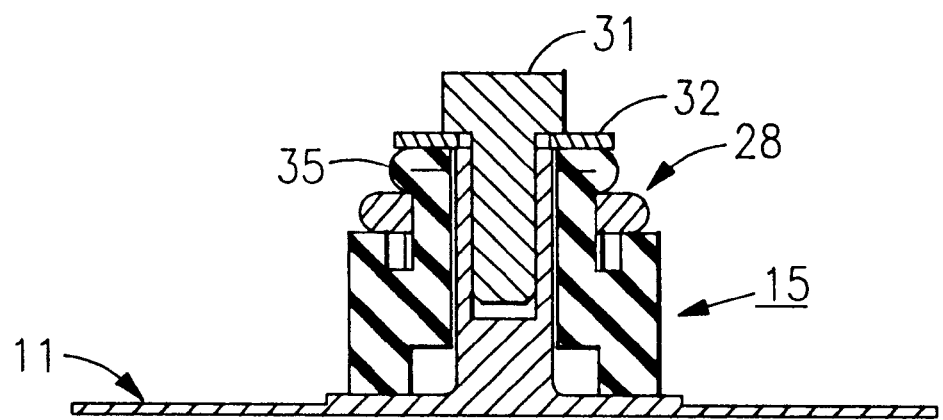
FIG. 6 is a side view in section showing the grommet mounted upon the base plate in a compressed condition.

A bolt 31 and washer 32 are used to compress the grommet in assembly. The shank of the bolt is passed through the washer and then downwardly through the opening in the grommet. The bolt is then threaded onto the boss to initially hold the assembly together in an uncompressed state as illustrated in FIG. 5. FIG. 6 shows the assembly after the bolt has been threaded down tightly into the base plate boss. Tightening the bolt places a compress load upon the body of the grommet which in turn causes the upper part of the body to expand outwardly about the weakened section to create an upper flange 35. The bolt is tightened sufficiently to secure the machine mounting bracket between the foot piece and the upper flange of the grommet. As can be seen, the hole in the bracket and the upper and lower surfaces of the bracket about the hole are captured in the rubber-like grommet, thus protecting the machine regardless of whether the machine is turned on its side or even inverted. This, of is an important feature particularly during shipping where the container housing the machine might be mishandled. It should be further noted that the base plate with the machine mounted thereon may be removed from the shipping container and installed in an air conditioning system as a unit. Once in place, the grommets will act as dampers to isolate the machine from the system.

Figure 7:
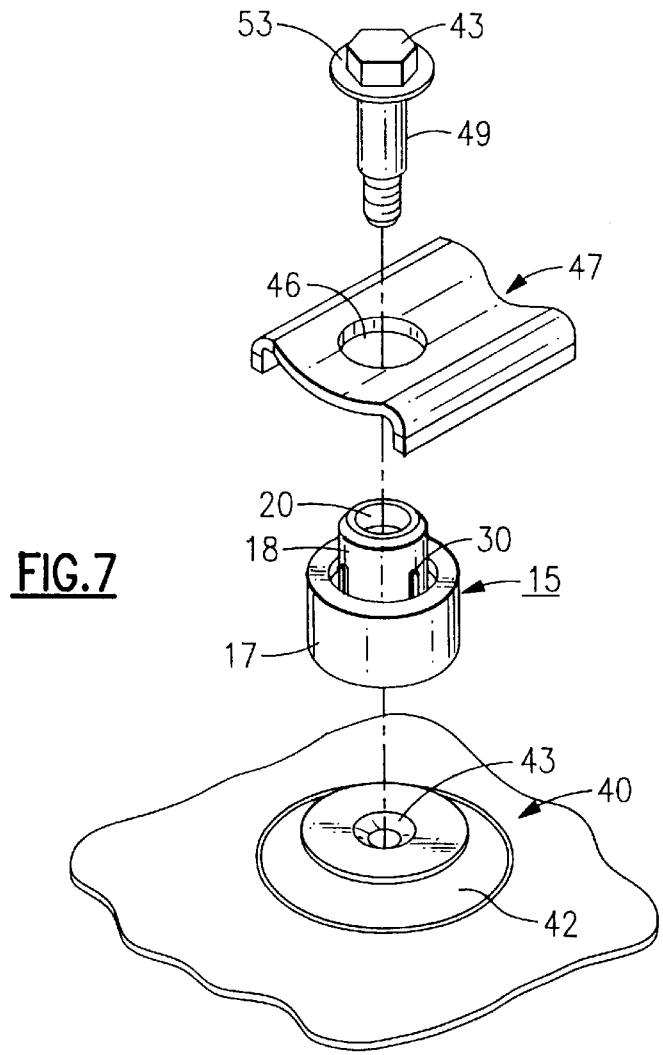
FIG. 7 is exploded view in prospective showing a further embodiment of the invention.
Figure 8:
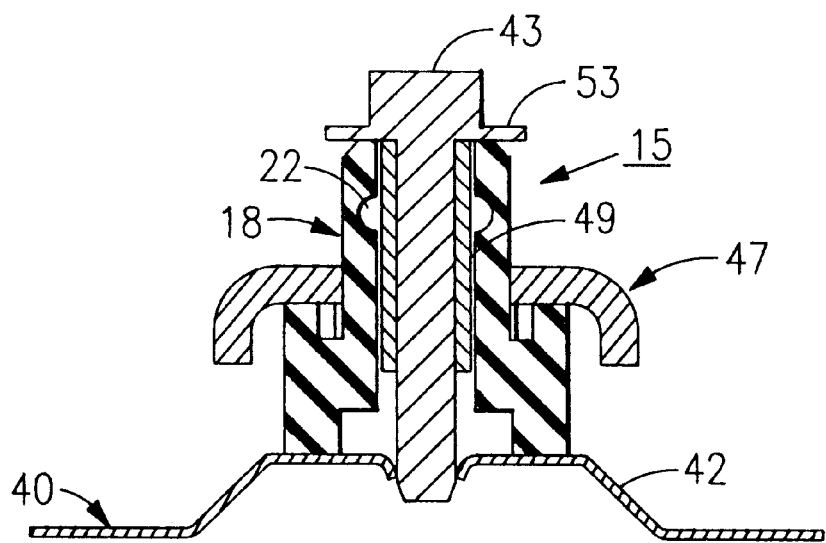
FIG. 8 is a side view in section of the embodiment illustrated in FIG. 7 showing the grommet in an uncompressed state.
Figure 9:
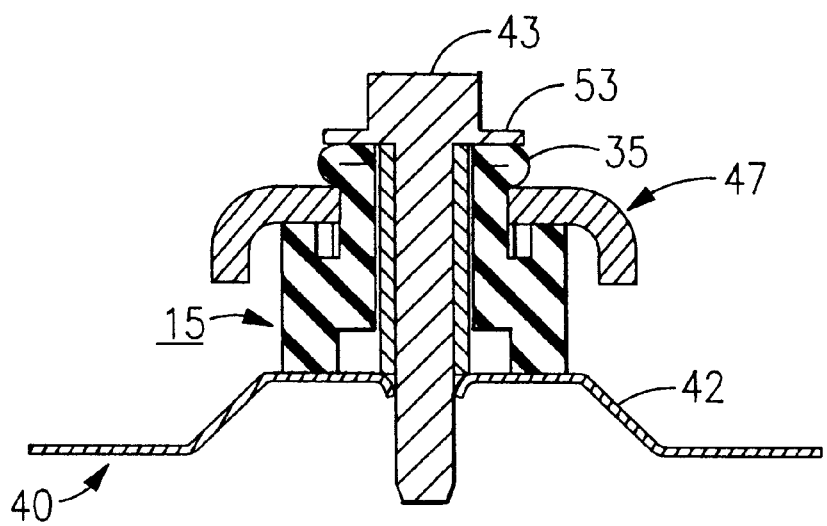
FIG. 9 is a side view in section of the embodiment illustrated in FIG. 7 showing the grommet in a compressed state.

Turning now to FIGS. 7–9, there is illustrated a further embodiment of the invention wherein the previously noted base plate 11 containing raised bosses 13 has been replaced with a more conventional base plate 40 which may be constructed of metal, plastic, or a high strength composite. The base plate has a series of contoured seats 42 each of which contains a centrally located hole 43 adapted to receive a bolt 43. In this embodiment, the grommet 15 has the same geometry as described above which includes an expanded foot piece 17, an elongated cylindrical body 18 and a central opening 20. The body again contains a weakened section in the upper part thereof, which as explained above, permits the upper part of the body to expand radially to form a flange 28 when the body is placed under compression.

Here again, the body of each grommet can be inserted into the mounting holes 46 of a machine support bracket 47 and frictionally retained in the hole by means of ribs 30. The grommets which are attached to the support bracket are then placed on the seats of the base plate and a metal sleeve 49 is passed into the opening. The bolt 43 containing washer 53 is now passed downwardly through the sleeve and the opening and threaded into the hole 43. The axial length of the sleeve, as illustrated in FIG. 9 is about equal to the axial length of the opening in the grommet that extends upwardly from the bottom surface of the grommet to the groove formed in the upper part of the body section.

The assembly is shown in FIG. 8 in an uncompressed state. Tightening the bolt down applies a compressive force to the body of the grommet causing the top part of the grommet to expand radially to create an upper flange 35 as described above. Accordingly, the bracket is captured between the foot piece of the grommet and the upper flange thus securing the machine to the base plate. Once secured, the machine is isolated by the grommets which absorb both externally and internally induced vibrations.

As should now be evident, the apparatus of the present invention provides isolation whether the support bracket is moving either upwardly or downwardly with respect to the grommets. Because the present grommet does not contain a permanent upper flange that must be forced through the receiving holes in the machine support bracket, the grommet can be easily and quickly installed and is not subject to damage during installation and removal from the support bracket.

Figure 10:
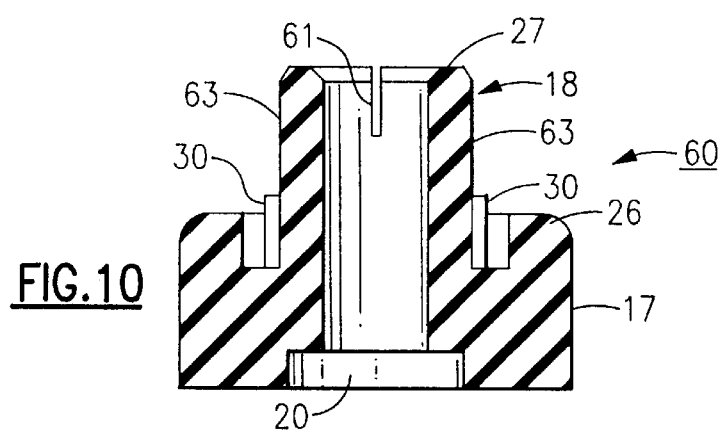
FIG. 10 is an enlarged side view in section showing another grommet suitable for use in the practice of the present invention.

FIG. 10 illustrates a grommet 50 suitable for use in the present apparatus. The grommet is quite similar to that described above with like references indicating like parts. The weakened section of the upper body, however, is provided by two opposed axially cutouts 51 that pass downward through the top of the body. Here again, placing the body section under compression causes the diametrically opposed half-sections 53 to expand outwardly in opposite directions to create a flange over a bracket mounted upon the grommet.

While this invention has been explained with reference to the structure disclosed herein, it is not confined to the details set forth and this invention is intended to cover any modifications and changes as may come within the scope of the following claims:

What is claimed is:

1. Apparatus for resiliently supporting a machine said apparatus including a base plate having a plurality of raised bosses protruding to a given height, above a top surface of said base plate, said bosses being spaced apart in a predetermined pattern whereby mounting brackets of a machine can be axially aligned with said bosses, a grommet mounted upon each of said bosses, each grommet having central axis and a lower flange that is seated upon the top surface of said base plate and a body section extending upwardly from said flange with an opening passing axially through said lower flange and the body section for receiving a boss therein, the height of said body section being greater than the height of the boss contained therein so that an upper part of the body section extends above the top of said boss, said body section having a uniform cross-section along its length whereby the body section can pass freely through a receiving hole in a mounting bracket of a machine and a weakened section in the upper part thereof that is located above the top of a boss whereby the upper part expands outwardly in a radial direction to create an upper flange when the grommet is placed under a compressive load; and means to compress said grommet.

2. The apparatus of claim 1, wherein said weakened section of said grommet includes a circumferential cutout radially formed within said opening in the upper part of the said body section.

3. The apparatus of claim 2, that further includes a metal sleeve that is positioned within said opening, said sleeve having an axial length that is less than the axial length of said opening between the bottom of said opening when said grommet is in an uncompressed state as measured at the lower flange and the circumferential cutout in the upper part of the body section.

4. The apparatus of claim 1, wherein said body section of each grommet contains a series of radially disposed ribs mounted about a lower part of the body section whereby said ribs can frictionally engage an inner wall of a receiving hole formed in a machine bracket to center the bracket upon said grommet.

5. The apparatus of claim 4, wherein said lower flange contains a circular groove in its top surface that surrounds the body section and wherein said ribs extend downwardly into said circular groove.

6. The apparatus of claim 1, wherein said compression means is a bolt that is arranged to pass through the opening in said grommet and is threadably retained in said base plate.

7. A grommet made of a resilient material for isolating a machine subject to vibration, said machine containing mounting brackets each of which contains a grommet receiving hole passing therethrough, said grommet including a radially expanded lower flange and an elongated body section integral and in axial alignment with said lower flange and an axially disposed opening passing through the lower flange and the body section, said body section having an upper part containing a weakened section formed in said opening so that said upper part of the body section will deform radially when the grommet is placed under a compressive load to create an upper flange, said body section having a cross-section along its entire uncompressed length such that said body section can pass through a hole in a mounting bracket, said body section further including a series of circumferentially spaced ribs that extend axially along the outer surface of the body section adjacent to the lower flange whereby said ribs are able to frictionally engage an inner wall of a mounting bracket hole, and said lower flange having an upper surface containing a circular groove passing downwardly into said lower flange adjacent said body section.

8. The grommet of claim 7, wherein said ribs extend downwardly into said circular groove.

9. The grommet of claim 7, wherein said weakened section contains a circumferential cutout formed in the inner wall of said opening.

10. The grommet of claim 9, that further includes a metal sleeve contained in said opening that has an axial length when the grommet is in an uncompressed state about equal to an distance from the bottom of the lower flange to the cutout formed in said opening.

* * * * *